INVENTORS:
FRED W. FALK AND
GEORGE C. EDWARDS

INVENTORS:
FRED W. FALK AND
GEORGE C. EDWARDS

SECTION 6C÷6C

FIG. 6C

INVENTORS:
FRED W. FALK AND
GEORGE C. EDWARDS

ATTORNEYS

FIG. 7

FRED W FALK AND
GEORGE C. EDWARDS, INVENTORS

ATTORNEYS

United States Patent Office 3,226,847
Patented Jan. 4, 1966

3,226,847
COMPUTERS AND SIMULATORS OF ATOMIC RADIATION
Fred W. Falk and George C. Edwards, Pirmasens Germany (U.S. Army General Depot APO 189 P.M., New York, N.Y.)
Filed July 11, 1962, Ser. No. 209,493
8 Claims. (Cl. 35—19)

This invention relates to a computer system and more particularly relates to a computor system for solving equations having the form $y=bx^k$ and finds particular utility in a system for simulating radioactive fallout data.

Training of Armed Forces and Civil Defense personnel in gathering radiation data and using that data to predict future dose rates and total dose can be given realism by simulating lethal fallout.

Heretofore, this has been done by use of a radio transmitter as a simulated source of radiation and a receiver contained in a housing resembling a radiation measuring instrument. This system has the disadvantages associated with radio propagation and the need for a costly transmitter and antenna system to be located and remotely operated in the training area.

The equation relating the dose rate at any given time to the dose rate at any prior given time and to the decay rate is of the form $y=bx^k$. This equation may also be written in logarithmic form as:

$$\text{Log } y = \log b + K \log x$$

Conventional computer circuits for solving this type of equation are not well suited for construction of a practical and economical device resembling a portable radiation measuring instrument due to the resulting cost and complexity of the device.

Therefore, an object of the invention is to provide a simple circuit for finding the product of a constant times the logarithm of a number.

A further object of this invention is to provide a simple system for simulating radioactive fallout data relating the dose rate at any given time to the dose rate at any prior given time.

Another object of this invention is to provide a simple system for simulating radioactive fallout data having provision for varying the decay factor.

A still further object of this invention is to provide a simple system for simulating radioactive fallout data having provision for simulating a build-up time for the fallout to accumulate.

Another and still further object of this invention is to provide a simple system for simulating radioactive fallout data having provision for simulating the attenuation effect of shielding on the radiation.

Still another object of this invention is to provide a simple system for simulating radioactive fallout data having provision for providing a simulated surprise time before indication of a radiation dose rate.

Another and yet still further object of this invention is to provide a simple system for simulating radioactive fallout data having means for calibration built into said system.

Still another and further object of this invention is to provide a simple system for solving equation of the general form $y=bx^k$.

The above and other objects, features and advantages of the present invention will become apparent upon consideration of the following description when read in conjunction with the accompanying drawing. The simulator described in this specification and appended claims has provisions for internally programming the following variables which would be part of lethal radioactive fallout present in atomic warfare:

(a) Time of burst or age of fallout.
(b) Dose rate at time $t$.
(c) Decay rate.
(d) Time of arrival and duration of build up during fallout.

In addition provision is made for the following external controls to be used by the operator of the instrument which has the appearance of a standard radiation meter.

(a) "On-off" switch
(b) Full scale or electrical calibration adjustment.
(c) Dose rate attenuation control to simulate various types of fallout shelter.
(d) A meter calibrated in roentgens per hour.

The internal circuitry of the invention solves the following equation:

$$R = R_{t=1} t^{-K}$$

Where:
 $R$ = dose rate at time $t$
 $R_{t=1}$ = dose rate at time $t=1$
 $t$ = time
 $-K$ = decay factor or slope on a log-log plot of dose rate R as a function of time $t$ The logarithmic solution of the equation gives:

$$\log R = \log R_{t=1} - K \log t$$

$$R = \text{antilog } \log R_{t=1} - K \log t$$

In the drawing.

FIGURES 6–A, 6–B and 6–C, respectively, present the mechanical arrangement of a clock driven potentiometer used to provide a variable buildup time and starting time of simulated radiation from radioactive fallout.

In the following discussion it should be kept in mind that the variables in the equations can represent any desired value in an equation of the same general form. However, for the sake of illustration, the variables given above for the radioactive fallout decay equation will be used. Furthermore, it should be realized that the values of circuit components are not to be considered restrictive and are only intended to illustrate values which will suffice.

The invention is based on the fact that this equation may be solved with a fairly high degree of accuracy with a voltmeter circuit and two voltage sources, where source No. 1 is used to develop a voltage corresponding to log $R_{t=1}$ and voltage source No. 2 is used to develop a voltage corresponding to the term $K \log t$. See basic block diagram, FIG. 1.

Figure 1:
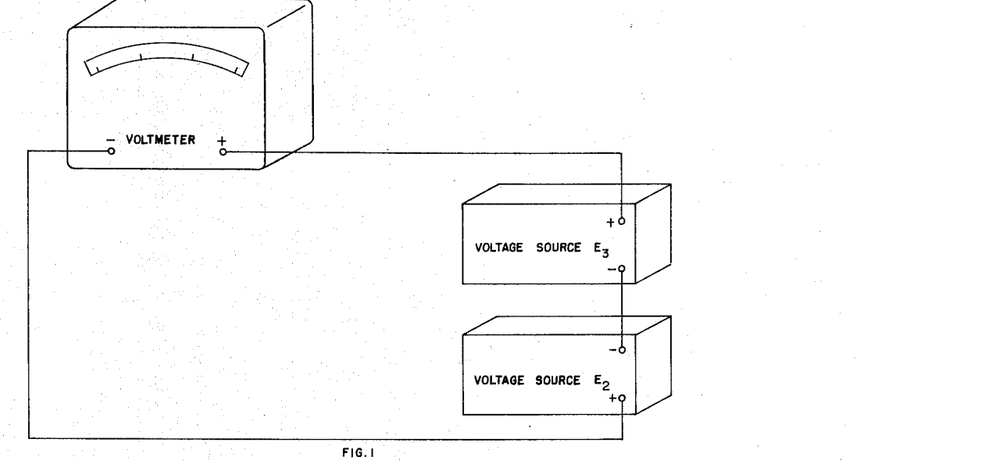
FIGURE 1 shows a simplified block diagram of an analog computing device which can be used to solve an equation of the form given above.

The voltage from source No. 1, corresponding to the value log $R_{t=1}$ is applied to the voltmeter to cause positive meter deflection and the voltage from source No. 2 corresponding to the term $-K \log t$ is applied to the voltmeter to cause negative meter deflection.

Thus the resulting meter indication directly corresponds to the term $\log R_{t=1} - K \log t$.

The antilog of log R is obtained by scale calibration of the meter movement. The scale is logarithmically calibrated so that the value indicated on the scale is the antilog of the difference between the two applied voltages. This is analogous to the process of obtaining the antilog of a number with a slide rule.

Figure 2:
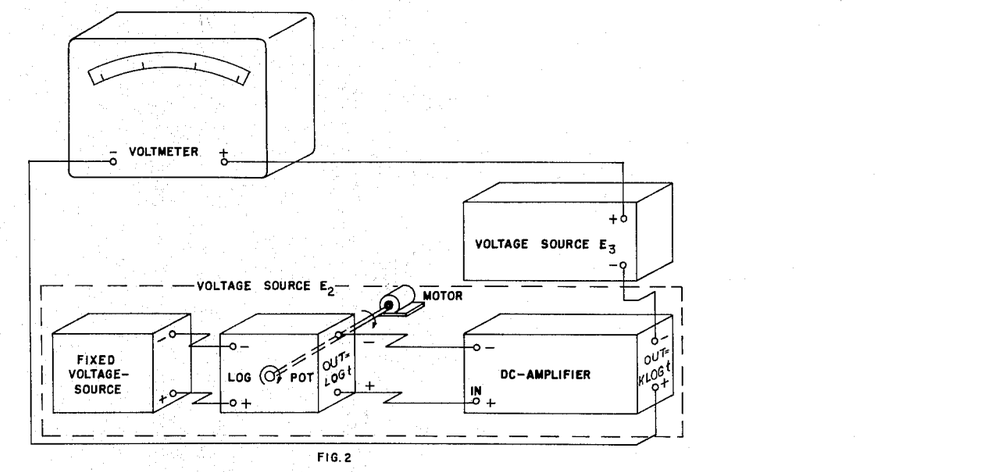
FIGURE 2 shows the device of FIGURE 1 wherein the source of voltage $E_2$ has been detailed to illustrate one method of its realization.

To solve the decay equation for all values of the variables with meter indication would require an analog computing system with a complexity in the order of that shown in FIG. 2. The circuit to develop the term $K \log t$ consists of a stabilized D.C. amplifier with variable gain adjusted to the value of K which amplifies the output of a logarithmic potentiometer driven as a function of time. This circuit is too complex and expensive to be used in a simple portable instrument.

In a training instrument developed of a voltage which is a close approximation of the voltage which would correspond to the term $K \log t$ is adequate. This greatly simplifies the circuitry by eliminating the need for the D.C. amplifier and logarithmic potentiometer shown in FIG. 2. The circuit to develop a voltage approximately corresponding to the term $K \log t$ is further simplified by making use of certain practical limits. These limits are:

(1) Programmed time variation of not more than 9 hours.
(2) Starting time not less than $t=1$ hour.
(3) The values of K between 1 and 2 are selected in steps; thus K is treated in any one circuit as a constant.

When the above limits are applied to the decay equation where $$R = \text{antilog} (\log R_{t=1} - K \log t)$$

practical numerical limits are obtained for the problem. For example: if K is equal to 1.5, log $t$ will vary from the value 0 to 1 as time changes from 1 to 10 hours and the complete term (K log $t$) is thus limited to values between 0 and 1.5. If only these limits to the solution are considered it can be seen that a voltage divider solution is suggested. If more than 1.5 voltage units are applied to a voltage divider it is possible to get output voltages covering the range 0 to 1.5 voltage units.

The problem is to develop an output voltage which varies as a function of time at a rate approximating the nonlinear function $K \log t$.

Figure 3:
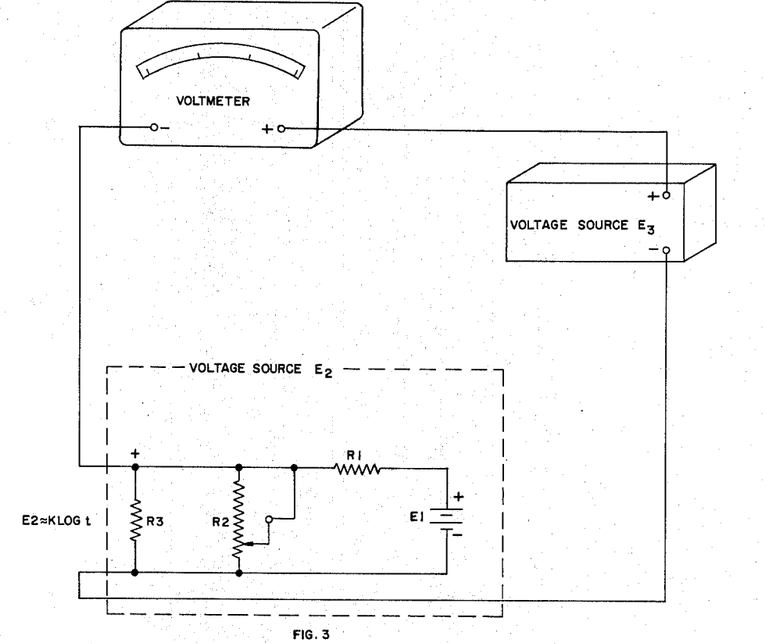
FIGURE 3 shows the device of FIGURE 1 wherein the voltage $E_2$ is supplied by the simplified circuitry which is one of the objects of the present invention.

The circuit indicated as voltage source No. 2 in FIG. 3 will suffice to show show the voltage divider is set up to deliver an output voltage which closely corresponds to the term $K \log t$, where $K=1.5$ and $t$ varies from 1 to 10 hours. In this circuit the 180 ohm linear potentiometer is connected to serve as a variable resistor and is driven by standard clockwork to develop a function of time. Since $R_2$ is linear a rate of change of 20 ohms per hour takes place over the decade of time represented by the 9 hour period between 1 and 10 hours. The applied voltage must be greater than 1.5 voltage units to allow the use of resistor $R_1$ in series with $R_2$ to establish the initial slope of the curve representing output voltage versus time. Thus a convenient value of 3 voltage units was chosen as supply voltage. Resistor $R_3$ which shunts $R_2$ has little or no effect during this early part of the curve because at that time the instantaneous value of $R_2$ is quite small.

As $R_2$ builds up toward its maximum value of 180 ohms, $R_3$ has an increasing effect in shaping the output voltage to follow the relationship 1.5 log $t$.

Mathematically the operation of the circuit consisting of resistors $R_1$, $R_2$ and $R_3$ in FIG. 3 can be described as follows:

To demonstrate that:

$$E_2 \approx K \log t$$

observe that $$E_2 = f(E_1, R_1, R_3, R_{2\,\text{max.}}, t')$$

where $$R_2 = f(R_{2\,\text{max.}}, t') = \frac{dR_2}{dt'} t' = \frac{ds}{dt} \cdot \frac{dR_2}{ds} \cdot t' = v \cdot \frac{dR_2}{ds} \cdot t' = v \frac{R_{2\,\text{max.}}}{s} \cdot t'$$

for a linear resistor $R_{2\,\text{max.}}$.

where:

$v=$ linear velocity of wiper arm travel
$E_1=$ voltage in units required for one decade deflection on the meter
$t'=$ time starting with 0 at $s=0$
$s=$ linear distance covered by wiper arm
$R_{2\,\text{max.}}=$ maximum resistance of variable resistor $R_2$.

Converting to a circular potentiometer connected as a variable resistor as shown in FIG. 3 gives:

$$v = 2\pi f r; \quad s = \frac{2\pi}{360} \cdot rb$$

$$R_2 = \frac{2\pi f r \cdot R_{2\,\text{max.}} \cdot t'}{2\pi/360 \cdot b \cdot r} = \frac{360 f R_{2\,\text{max.}}}{b} \cdot t'$$

where:

$f=$ shaft revolutions per unit of time
$r=$ radius of wiper arm
$b=$ traverse angle of $R_2$ from 0 to maximum resistance with the substitutions $t = t'_1 + a$ and $$k = \frac{360 f R_{2\,\text{max.}}}{b}; \quad R_2 = kt' = k(t-a)$$

For most practical applications the time interval of interest is the decade between $t=1$ and $t=10$ in which case proper dimensioning of $k$ will result in $R_2$ being equal to $R_{2\,\text{max.}}$ at time $t=10$ or:

$$R_{2\,\text{max.}} = \frac{360 f R_{2\,\text{max.}}}{b} \cdot 9; \quad \frac{360 f}{b} = \frac{1}{9}$$

The simultaneous equations for the network of resistors $R_1$, $R_2$ with voltage source $E_1$ and output voltage $E_2$ in terms of current $I_1$ through $R_1$, $I_2$ through $R_2$ and $I_3$ through $R_3$ are:

$$E_1 = I_1 R_1 + E_2$$
$$E_2 = I_2 R_2 = I_3 R_3$$
$$I_1 = I_2 + I_3$$

solving for $E_2$ gives $$I_1 = \frac{E_1 - E_2}{R_1} = I_2 + I_3$$

$$E_1 = (I_2 + I_3) R_1 + E_2 = \left(\frac{E_2}{R_2} + \frac{E_2}{R_3}\right) R_1 + E_2$$

$$= E_2 + E_2 R_1 \left(\frac{1}{R_2} + \frac{1}{R_3}\right)$$

$$= E_2 \left[1 + R_1 \left(\frac{1}{R_2} + \frac{1}{R_3}\right)\right];$$

$$E_2 = \frac{E_1}{1 + \frac{R_1}{R_2} + \frac{R_1}{R_3}}$$

Replacing $R_2$ with $kt'$ gives $$K \log t \approx \frac{E_1}{1+\frac{R_1}{kt'}+\frac{R_1}{R_3}}$$

$$= \frac{E_1}{\frac{kR_3t'+R_3R_1+kt'R_1}{kt'R_3}} = \frac{kt'R_3E_1}{kR_3t'+R_3R_1+kt'R_1}$$

$$= \frac{kt'R_3E_1}{t'(kR_3+kR_1)+R_3R_1} = \frac{t' \cdot \frac{kR_3E_1}{kR_3+kR_1}}{t'+\frac{R_3R_1}{kR_3+kR_1}}$$

with the substitution $$a = \frac{R_3R_1}{2(kR_3+kR_1)}$$

and $t = a + t_2$, one can write:

$$\left(\frac{kE_1 a}{(0.4343R_1)}\right)\left(\frac{2t' \cdot 0.4343}{t'+2a}\right) \approx K \log (t'+a)$$

It can now be seen that the term $$\frac{2t' \cdot 0.4343}{t'+2a}$$

corresponds to the first variable term of an infinite series for the logarithm of $t'+a$ which is written:

$$\log (a+t') = \log a + 0.8686\left[\left(\frac{t'}{2a+t'}\right)+\frac{1}{3}\left(\frac{t'}{2a+t'}\right)^3 + \frac{1}{5}\left(\frac{t'}{2a+t'}\right)^5 + \cdots\right]; a > 0, -a < t' < +\infty$$

thus $$\frac{0.8686 t'}{t'+2a} \approx \log (t'+a)$$

and $$\frac{kE_1 a}{0.4343 R_1} \approx K$$

In the most practical application of the circuit the beginning of movement of the wiper arm of $R_2$ at $t'=0$ corresponds to $t=1$. Therefore $t=t'+1$, or $a=1$. The constant term of the infinite series is then $\log a = \log 1 = 0$, thus causing the first variable term to give a better approximation.

If constant values for the parameters $k$, $E_1$, $a$, $R_{2\ max}$ and $K$ are assigned $R_1$ can be calculated by rewriting the above approximation for $K$ and solving for the relationship $$R_1 = \frac{kE_1}{0.4343 K}$$

Where $a$ has been set equal to one and $R_3$ from the relationship $$R_3 = \frac{R_1}{\frac{E_1}{K}-\frac{R_1}{R_{2\ max.}}-1}$$

which is obtained by observing that $R_2 = kt' = R_{2\ max.}$ and $\log 10 = 1$ at time $t=10$ and then solving the equation $$K \log t = \frac{E_1}{1+\frac{R_1}{k(t-a)}+\frac{R_1}{R_3}}$$

for $t=10$ in terms of $R_3$.

Thus dimensioned the circuit will give exact solutions of $K \log t$ at $t=1$ and $t=10$.

Figure 7:
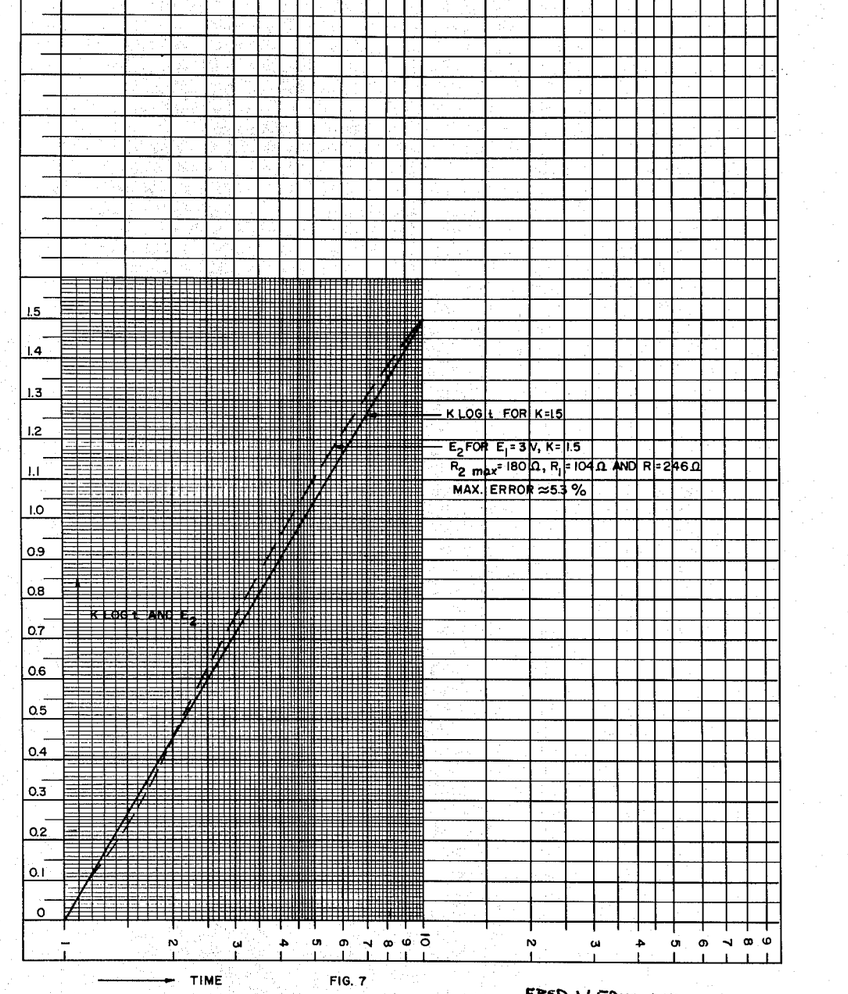
FIGURE 7 shows the error obtained from approximation when using the given circuit values for computing $K \log t$ with the circuit of FIGURE 3.

For more accurate dimensioning the required values of $R_1$ and $R_3$ which cause the voltage divider output voltage $E_2$ to exactly equal the term ($K \log t$) at two points on the curve may be determined by simultaneous equations as follows: the voltage divider output voltage in terms of assumed values for the parameters $R_2$ and $E_1$ and unknown values $R_1$ and $R_3$ is set equal to the term $E_2 = K \log t$ for which values are assigned for selected points on the curve. In other words set $$\frac{E_1}{1+\frac{R_1}{k(t-1)}+\frac{R_1}{R_3}} = K \log t$$

at time $t_1$ and time $t_2$ and solve the resulting simultaneous equations. For the practical interval of interest between $t=1$ and $t=10$ simultaneous solution of the voltage output equation to exactly equal the term $K \log t$ at times $t=2$ hours and $t=10$ hours is possible. The curve representing the divider output voltage versus time then gives the correct solution of $K \log 1 = 0$ at time $t=1$, due to the fact that the output is equal to zero since the wiper arm of $R_2$ is caused to start from ground potential at time $t'=0$, $t=1$. Further, the correct solution at an intermediate point where time $t=2$ and at the end of the interval where time $t=10$ is guaranteed by this method of dimensioning. A curve showing solutions for the circuit of voltage source No. 2 in FIG. 3 where $K=1.5$, the supply voltage input is 3 units, $R_1=104$ ohms, $R_3=246$ ohms, and $R_2$ varies from 0 to 180 ohms at the rate $k=20$ ohms per hour, is given in FIG. 7. Here a plot of circuit output $E_2$ in voltage units is compared with the plot of $1.5 \log t$. The error occurring at intermediate points can be further redistributed to reduce it, as desired, at certain points by an empirical process of varying $k$, $R_1$ and $R_3$ until the desired results are obtained. The effect of the increase with time of the parallel resistance of $R_2 = kt'$ and $R_3$ in series with the voltmeter can also be taken into account in this manner. This is essentially what was done in determining the values of resistors performing a corresponding function in FIG. 5. It should be noted that for dimensioning purposes a practical but not restrictive value for the angular rate of rotation of the shaft of the decay potentiometer is $\frac{1}{12}$ revolution per hour available from the hour wheel of standard clockwork. Determination of the factor $k$ then reduces to constants determined by the potentiometer chosen. In selecting the decay potentiometer consideration must be given to the value of its total resistance in relation to the internal resistance of the indicating circuit. If the indicating circuit is a voltmeter the value should be low compared with the resistance of the voltmeter circuit. However, a compromise must be decided upon because too low a value would result in excessive loading of the voltage source $E_1$. Further, the interaction on the voltmeter circuit can actually be used to advantage when empirically distributing the error, since its effect is also a non-linear one which increases with increasing time.

In selecting the decay potentiometer consideration can also be given to the optional use of shorted turns for a segment at the beginning of rotation. It is then possible to allow the clockwork to run for the period of time that it takes for the potentiometer to traverse the shorted segment before time $t=1$ occurs. This was done to allow for a standard surprise time plus buildup time without decay of 43 minutes in the model for which programming instructions are provided.

Figure 4:
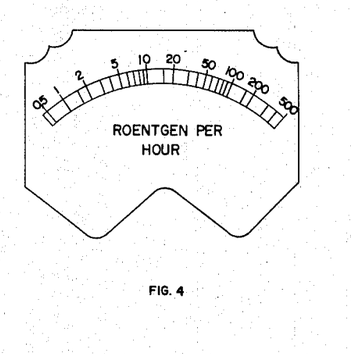
FIGURE 4 shows a typical dial which could be used for the voltmeter shown in the preceding illustrations if the device were being used to simulate the presence of radiation.
Figure 5:
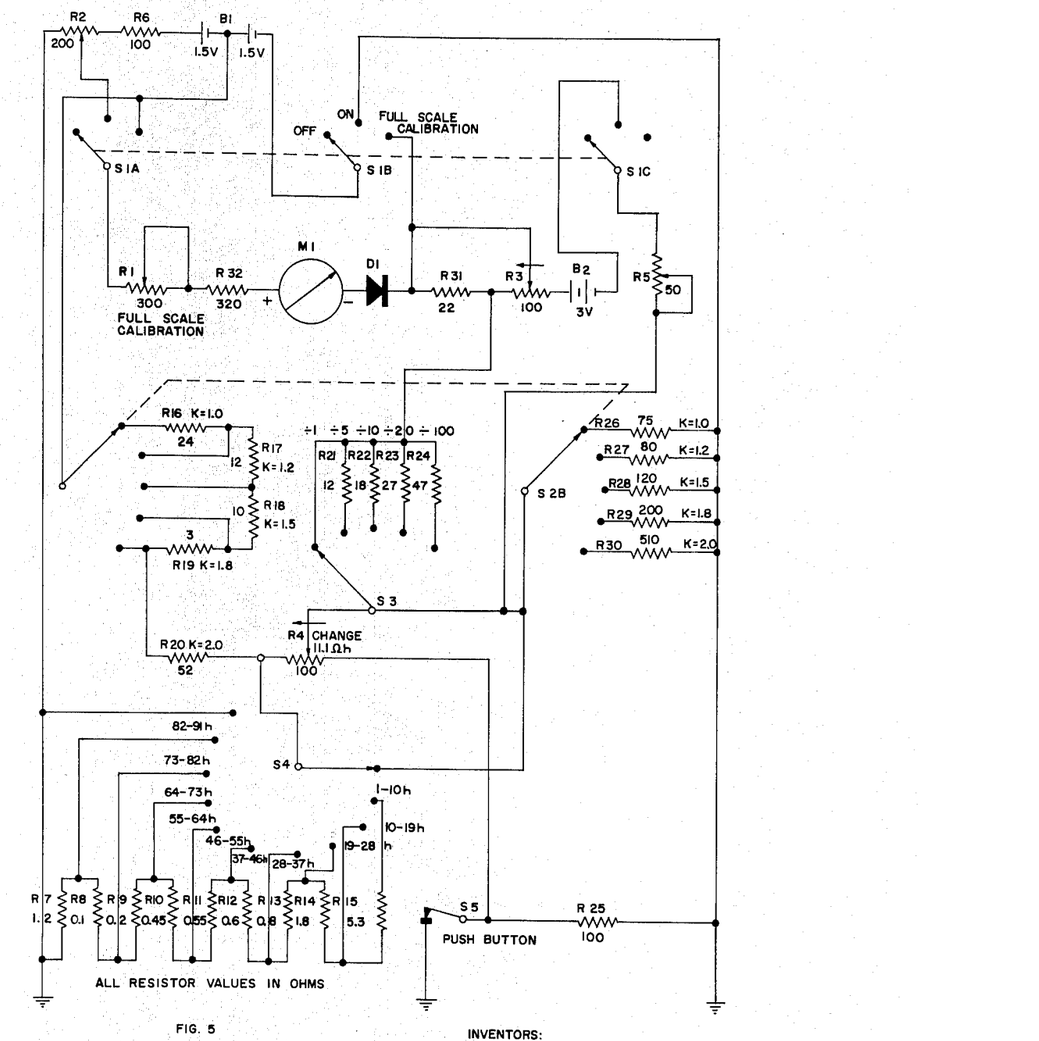
FIGURE 5 shows the detailed circuitry of a specific embodiment of the invention as a simulator of radiation.

An additional embodiment of the invention is shown in FIG. 5, where battery $B_1$ causes a current to flow through the limiting resistor $R_6$, the R set control $R_2$, switch $S_{1a}$ in the "ON" position, the full scale adjustment $R_1$, the voltmeter modifying resistor $R_{32}$, the meter $M_1$, the diode $D_1$, $R_3$ with arm at extreme left, $S_3$ in $\div 1$ position, thence in parallel through $S_{2b}$ and $R_{26}$–$R_{30}$ to ground and the decay potentiometer $R_4$, switch $S_5$ as shown to ground and return through, switch $S_{1b}$ in the ON position. This comprises the circuit for obtaining log $R_{t=1}$ on the meter at time $t=1$. One half of battery $B_1$ causes a current to flow through $S_{2a}$, one or more of the decay factor determining resistors $R_{16}$ through $R_{20}$ depending on the position of $S_{2a}$ and through switch $S_4$ in any position corresponding to periods between 1 and 91 hours to ground in parallel with current through decay potentiometer $R_4$ and in parallel with one of the resistors $R_{26}$ through $R_{30}$, as selected by switch $S_{2b}$ to ground and switch $S_5$ in position shown to ground and then back to battery $B_1$ through switch $S_{1b}$ in the ON position. The latter current flow causes a voltage drop across decay potentiometer $R_4$ of a polarity, such as to retard the current flow previously described. This reduction of current flow results in a decreased deflection of the meter $M_1$, proportional to $K \log t$. The decay potentiometer $R_4$ is driven by standard clockwork. A convenient rate is the 12 hours per revolution available from the hour drive of a standard clock. In FIG. 5 which represents a typical, but not restrictive, embodiment of the invention the angle of rotation was selected to give complete traverse of the decay potentiometer in 9 hours or a change of 11.1 ohms per hour. Solution to the decay equation is thereby accomplished in the following manner: At time $t=1$, $\log t = \log 1 = 0$ and $R=$antilog log $R_{t=1}=R_{t=1}$. This is the radiation dose rate which will be indicated on the meter $M_1$ when the decay potentiometer $R_4$ is positioned at the point of its traverse corresponding to $t=1$. This point is the beginning of traverse at the right of the potentiometer in the embodiment of the invention shown in FIG. 5. In this position the meter current meets no opposition from voltage drop across the decay potentiometer $R_4$. Under these conditions $R_{t=1}$ can be read directly from meter $M_1$ while making adjustments of the current flowing through the meter with the "R Set" control $R_2$. As the clockwork continues to drive the decay potentiometer $R_4$ from right to left in FIG. 5 the opposing voltage drop across $R_4$ is applied to the meter circuit and reduces the initial current. Ideally the amount of reduction is $K \log t$. With switch $S_4$ in the 1–10 hour position the circuit consisting of resistors $R_{16}$ through $R_{20}$, as selected by $S_{2a}$, $R_4$ and $R_{26}$ through $R_{30}$, as selected by $S_{2b}$ function as described previously for the circuit shown in FIG. 3. The meter $M_1$ and voltmeter multiplying resistor $R_{32}$ are selected to provide full scale deflection for 1.5 volts. The meter scale is marked logarithmically with three decades from 0.5 to 500 roentgens per hour. One voltage unit for one decade of deflection is therefore 0.5 volts. The values between 0 and 0.5 roentgens per hour are compressed at the beginning of the scale and have no numerical significance. A drawing of the scale is shown in FIG. 4. For 9 hour time periods above 10 hours switch $S_4$ provides a path parallel to decay potentiometer $R_4$ through one or more of the resistors $R_7$ through $R_{15}$ for current from the network of resistors $R_{16}$ through $R_{20}$. This reduces the voltage present on the wiper arm of decay potentiometer $R_4$ so that the reduction of current flow through the meter $M_1$ is less after a given time $t$ than would be the case without the shunting of $R_4$. For starting times between 10 and 82 hours the complete decay equation need not be solved as the decay which has occurred up till the starting time can be properly programmed in the setting of the R control, $R_2$. Thus variable resistor $R_2$ is adjusted to furnish a voltage corresponding to the expression (log $R_{t=1}-K \log t$) wherein $t$ is the starting time in hours. The decay potentiometer $R_4$ is connected as a potentiometer instead of a variable resistor for periods above 10 hours since all that is required is a voltage corresponding to the difference which develops between the expressions log $R_{t=1}-K \log t_1$ and log $R_{t=1}-K \log t_2$ where $0<(t_1-t_2)<9$ hours.

This simplifies to the difference between the term $K \log t_1$ and the term $K \log t_2$. Since the log of 10 is 1 and the log of 100 is 2 and the starting time $t$ is greater than 10 hours the log of $t$ will change very little during an additional time variation of only 9 hours and the change that does occur can be approximated by a linear rate. In other words the decay of 9 hour segments in the decade of the log-log decay relationship covering the period from 10–100 hours can be approximated by a 9 hour linear segment which starts and ends at values representing solutions to the equation. Resistors $R_{26}$ thru $R_{30}$ have very little effect in the circuit for fallout age above 10 hours due to the much greater effect of shunting resistors $R_7$ thru $R_{15}$. The dimensioning of the resistors $R_7$ through $R_{15}$ is done so that the radiation dose rate shown on meter $M_1$ is a solution to the decay equation at the end of the time period indicated on the labeling of the positions of switch $S_4$ when $R_4$ is rotated through its complete traverse. Switch $S_5$ and resistor $R_{25}$ are included to enable one to cause the same change in meter deflection as rotation of decay potentiometer $R_4$ from right to left in FIG. 5 by depressing the spring loaded switch $S_5$. This removes the short from the 100 ohm resistor $R_{25}$, thus placing the same resistance between the wiper arm of decay potentiometer $R_4$ and ground as is present when the wiper arm is rotated through its complete traverse. The circuit containing battery $B_2$ is used to provide simulated shielding of the radiation and to provide the buildup of radiation which simulates the fallout arriving and falling out on the surface of the earth. In the ON position of switch $S_{1c}$ the battery $B_2$ causes current to flow through the buildup potentiometer $R_3$, one of the dividing resistors depending on the position of switch $S_3$ and adjusting potentiometer $R_5$. The buildup potentiometer $R_3$ in FIG. 5 is driven from right to left by standard clockwork. The beginning time of buildup and buildup duration can be varied by gearing shown in FIGURE 6 wherein the buildup potentiometer $R_3$ is shown attached to standard clockworks in such a way as to allow freedom of rotation between its limit stops, the only driving force being my means of a pin through the shaft of potentiometer $R_3$ which comes in contact with a pin mounted at right angles in gear B. Gear B is engaged with and driven by the hour wheel A of the clock. Gear B is also mounted concentrically on the shaft of potentiometer $R_3$ and is allowed to turn freely until engagement is made between the aforementioned pins. If the buildup potentiometer $R_3$ is set at a limit stop by rotating the buildup duration set knob in a clockwise direction viewed from above, followed by rotation of the reset and surprise time control in a clockwise direction as viewed from below until the pins engage, it can be seen that the buildup potentiometer $R_3$ will be driven immediately by the clockworks. It can now be seen that if the buildup duration set knob is turned back a specified amount in the direction of the opposite limit stop after setting as described above, it will not rotate until the pin attached to Gear B rotates sufficiently to reengage the pin through the shaft of potentiometer $R_3$.

Figure 6A:
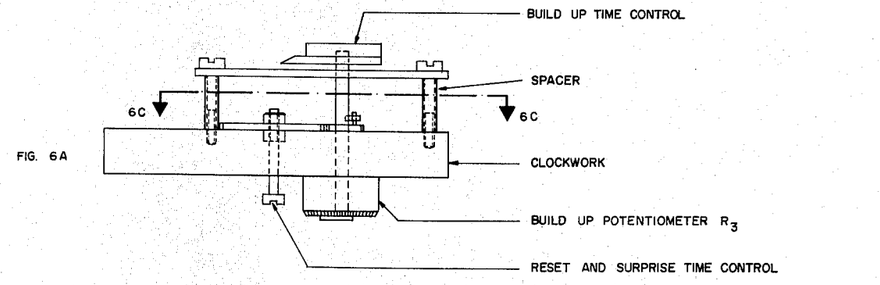
Figure 6B:
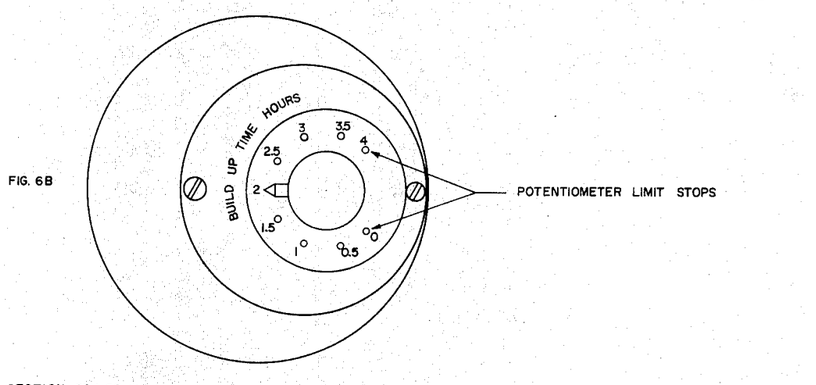
Figure 6C:
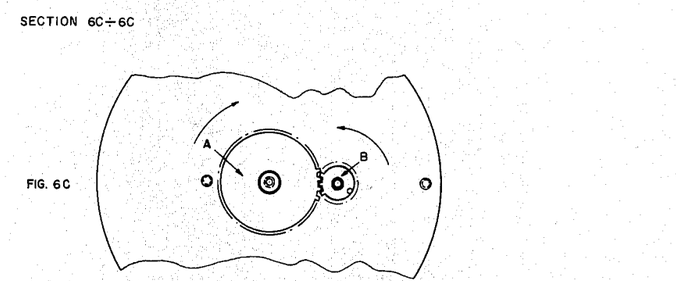

Thus a method is provided for a variable buildup duration through markings on a dial below the buildup duration set knob as shown in FIGURE 6. As an illustrative but non-restrictive example, the gear ratio of A to B may be 2 to 1 for a buildup potentiometer $R_3$ having a 270° rotation to obtain the scale shown. Other maximum buildup duration possibilities can be realized by a different choice of gear ratios. It should be noted that the reset and surprise time control corresponds to the set control of standard clockworks. It would normally be attached directly to the minute hand if used in a clock, and therefore, turns at a rate of one revolution per hour. This allows for variations of the beginning time of the buildup for a given buildup duration by counting the number of revolutions of rotation of the reset and surprise time control starting from the zero limit stop of buildup potentiometer $R_3$. When fully reset in the specific illustrative example described above, four hours —buildup duration equals surprise time; when partially reset, the number of revolutions of the reset and surprise time control from the zero limit stop of the buildup potentiometer $R_3$ minus buildup duration equals surprise time. Herein surprise time is defined as the interval between setting the buildup controls and the beginning time of buildup of the simulated radiation. When the buildup potentiometer $R_3$ is at the extreme right, as shown in FIG. 5, the voltage drop across $R_3$ is of the proper polarity to oppose the flow of current through the meter $M_1$. The magnitude of this opposing voltage is sufficient to cause the meter to read zero and for lower dose-rates $R_{t=1}$ the meter $M_1$ would show an indication of less than zero if it were not for the preventive action of the high inverse resistance of diode D. As the buildup potentiometer $R_3$ is driven from right to left as a function of time the opposing voltage drop across $R_3$ is gradually reduced and the indication on the meter gradually increases, and attains a maximum when $R_3$ reaches the limit of its traverse. Dividing resistors $R_{21}$ through $R_{24}$, as selected by switch $S_3$, serve to develop a bucking voltage to reduce the deflection by an amount equal to the logarithm of the dividing factor. For example: if it is desired to divide the antilog scale reading by a factor of ten it is necessary to apply a bucking voltage to the voltmeter circuit which is equal to the logarithm of ten in voltage units. This would be one voltage unit or 0.5 volt for the circuitry used in FIG. 5. Determination of the proper values for resistors $R_{21}$ through $R_{24}$ can be made by applying Ohms law to the current path described above. Adjusting resistor $R_5$ is provided to correct the division factor for aging batteries. Resistor $R_{31}$ is included to reduce the isolation and improve the operation of the simulated fallout shelter dividing circuit during the initial part of the buildup. In addition to the "On-off" positions of ganged switch $1_A$, $1_B$, and $1_C$ in FIG. 5 a full scale check position is provided. This position serves to allow adjustment of the voltmeter circuit to full scale deflection for 1.5 volts provided by one half of battery $B_1$. Adjustment is accomplished by setting the full scale adjust control $R_1$ thus controlling the current flow through the voltmeter circuit consisting of $R_1$, voltmeter multiplying resistor $R_{32}$, meter $M_1$, and diode $D_1$.

*Programming instructions for the model shown in FIGURE 5*

1. Factors to be programmed.
    (a) Decide what age fallout will be programmed. Decay can be programmed starting at any time from 1 to 82 hours after burst. A typical program would be the period 1 to 10 hours after burst with or without surprise time and buildup time.
    (b) Decide what maximum value of fallout radiation will be programmed. The meter can be correctly programmed to give the selected decay curve once a value is selected (between 0 and 5000 r./hr. and the time the decay starts is selected as in paragraph 1a, above.
    (c) Decide what rate of decay will be programmed in terms of factor K. Possible values are 1.0, 1.2, 1.5, 1.8 and 2.0. This K is an exponent in the denominator of the decay equation. This equation can be simplified in terms of R (roentgens per hour) which exist 1 hour after burst time and used to indicate what the decayed value will be at any later time.

Thus simplified for this special case the equation may be stated as

Dose rate R at any time after burst
$$= \frac{\text{Dose rate } R_{t=1} \text{ at 1 hr. after burst}}{(\text{time } t \text{ in hours after burst})^k}$$

Examples of Decay Resulting from K of 1 and 2

| K | R—1 hr. after burst | R—2 hrs. after burst | R—10 hrs. after burst |
|---|---|---|---|
| 1 | 400 r/hr. | $R = \frac{400}{(2)^1} = 200$ r/hr. | $R = \frac{400}{(10)^1} = 40$ r/hr. |
| 2 | 400 r/hr. | $R = \frac{400}{(2)^2} = 100$ r/hr. | $R = \frac{400}{(10)^2} = 4$ r/hr. |

2. Setting up controls.
(a) *Normal problem.*—(1 to 10 hours with surprise and buildup)
    (1) Operate $S_1$ to full scale check position.
    (2) Adjust $R_1$ to cause meter to read full scale then return $S_1$ to on.
    (3) Set $R_4$, the potentiometer which the 9 hour timing motor drives, fully counterclockwise.
    (4) Set $S_4$ (decay period step switch) to beginning time of 1 hour.
    (5) Adjust $R_2$ (R Set Control) for value R desired at start of decay which will occur at end of buildup.
    NOTE.—For values between 500 r./hr. and 5000 r./hr. operate shelter attenuator switch $S_3$ to divide by 10 position and the meter will read actual value divided by 10.
    (6) Set $S_2$ to value of K to give desired decay rate.
    (7) Depress $S_5$ (9 hour decay check push button). The meter will indicate the value of R at time $t=10$ or the time for which $S_4$ is set plus 9 hours if $R_4$ is set fully counterclockwise or opposite the one hour mark. Otherwise it will simply indicate a reduced value.
    (8) Wind the 9 hour timing drive motor with a screwdriver.
    (9) With a screwdriver adjust $R_3$ (mounted on drive motor) fully clockwise. This also winds the buildup drive motor. Thus set, $R_3$ will furnish a few minutes of surprise time (not more than 10 min.) followed by 30 to 40 minutes during which the simulated radiation builds up to the programmed value. If turned fully clockwise, 43 minutes are required after winding until the maximum simulated doserate is reached.
    (10) Close and lock instrument.
    (11) Give the instrument immediately to user, if the surprise effect is to be used.
(b) *Special problem.*—(1 to 10 hours without surprise and buildup). Follow same procedure as in 2a, except in Step (3), set the arm of $R_4$ opposite the 1 hour mark (silver dot on pot. housing) and omit Step (9).
(c) *Special problem.*—(Any period of decay between 1 and 91 hours).
    (1) Follow Steps (1) thru (3), paragraph 2a, except set $R_4$ to the time within the 9 hour period that decay is to start. (Beginning with the silver dot on pot. housing each revolution of the screwdriver control is one hour.)
    (2) Operate $S_4$ to the beginning of the period desired.
    (3) Adjust R Set Control, $R_2$, for value of R desired at start.
    (4) Follow Steps (6) thru (11), paragraph 2a, omitting Step (9).
(d) *Special problem.*—(Surprise and buildup prior to any age fallout from 1 to 91 hours)
    NOTE.—In all cases except when pot. $R_4$ is set fully counterclockwise prior to starting the buildup drive motor decay will be taking place during the buildup. The amount by which $R_2$ must be set high to obtain the desired dose rate at the end of the buildup can be read from an appropriate decay curve by going back 43 minutes.

The same as special problem 2c, except that Step (9) is not omitted.

3. Checking Batteries. The batteries should be changed when:
    (a) The meter cannot be adjusted to full scale in full scale check position.
    (b) The shelter attenuator does not divided properly.

We claim:
1. A system for simulating radioactive fallout data comprising, in combination:
   voltage sensitive meter means having a logarithmic scale for indicating radiation data in response to voltages applied to said meter means;
   first voltage supply means for supplying a first voltage predetermined as a function of maximum radition dose rate; and
   second voltage supply means for supplying a second voltage varying unidirectionally as a function of time and as a function of a decay rate for said radiation dose rate,
   said second voltage supply means comprising a voltage source and clock driven variable resistor means coupled with said voltage source for controlling the output of said second voltage supply means;
   said first voltage supply means and said second voltage supply means being connected in series with said meter means whereby the voltage supplied thereto represents the sum of voltages supplied by said first voltage supply means and said second voltage supply means.

2. A system for simulating radioactive fallout data as described in claim 1, wherein said second voltage supply means further comprises:
   a plurality of resistances; and
   switch means for selectively connecting said resistances with said clock driven variable resistor means to enable the output of said second voltage supply means to represent a particular time period by adjustment of said switch means.

3. A system for simulating radioactive fallout data is described in claim 1, wherein said second voltage supply means further comprises:
   a plurality of resistances; and
   switch means for selectively connecting said resistances with said clock driven resistor means whereby the output of said second voltage supply means can be made representative of a particular radiation decay rate by adjustment of said switch means.

4. A system for simulating radioactive fallout data as described in claim 1, further comprising:
   third voltage supply means for supplying a third voltage varying unidirectionally as a function of time and as a function of radiation buildup rate,
   said third voltage supply means comprising a voltage source and clock driven variable resistor means coupled with said voltage source for controlling the output of said third voltage supply means;
   said third voltage supply means being connected in series with said meter means whereby the voltage applied thereto represents the sum of voltages supplied by said first, second and third voltage supply means.

5. A system for simulating radioactive fallout data as described in claim 4, wherein said third voltage supply means further comprises:
   a plurality of resistances; and
   switch means for selectively connecting said resistances with said clock driven variable resistor means to enable the output of said third voltage supply means to be representative of the attenuation of the radiation dose rate due to shielding.

6. A system for simulating radioactive fallout data as described in claim 4, wherein said last mentioned clock driven variable resistor means comprises:
   variable resistor means having a control shaft;
   drive means mounted to said control shaft;
   clockworks comprising motor means and gearing means driven by said motor means; and
   cam means driven by said gearing means to drive said drive means when in engagement therewith;
   said cam means and said drive means being so constituted and arranged as to enable said cam means to be driven for a selected time interval before engaging said drive means to permit the simulation of a surprise time before indication of the radiation dose rate.

7. A system for simulating radioactive fallout data as described in claim 4, wherein:
   said meter means further comprises a diode for precluding any voltage flow reversely through said meter means; and
   said third voltage supply means further comprises an isolating resistance to prevent interaction of said third voltage supply means with said first and second voltage supply means.

8. A system for simulating radioactive fallout data as described in claim 1, wherein:
   said meter means comprises:
   full scale adjustment means, and
   switch means selectively connecting said voltage source directly to said meter means to enable said meter means to be calibrated to compensate for variations in said voltage source; and
   said second voltage supply means further comprises:
   fixed resistor means, and switch means operatively associated with said fixed resistor means and said clock driven variable resistor means to permit selective substitution of said fixed resistor means for said clock driven variable resistor means and thereby cause said meter means to register a radiation dose rate corresponding to a desired position of said clock driven variable resistor means.

References Cited by the Examiner

UNITED STATES PATENTS

| | | | |
|---|---|---|---|
| 2,622,798 | 12/1952 | Aughtie | 235—193 |
| 2,900,740 | 8/1959 | Brault et al. | 35—1 |
| 3,011,717 | 12/1961 | Schuck | 235—193 |
| 3,072,335 | 1/1963 | Harper | 235—193 |

FOREIGN PATENTS 1,261,067   4/1961   France.

OTHER REFERENCES

"Classmaster" Radioactivity Demonstrator, advertisement of the Welch Scientific Company. The Science Teacher, vol. 28, No. 8, December, 1961, page 2.

Cenco's Radioactivity Demonstrator, advertisement of Central Scientific. The Science Teacher, vol. 28, No. 8, December, 1961.

EUGENE R. CAPOZIO, *Primary Examiner.*

LEO SMILOW, JEROME SCHNALL, *Examiners.*